United States Patent
Akiyama

(10) Patent No.: US 6,926,413 B2
(45) Date of Patent: Aug. 9, 2005

(54) SUPPORTING MECHANISM FOR SOLID TYPE ROD INTEGRATOR

(75) Inventor: Koichi Akiyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/726,582

(22) Filed: Dec. 4, 2003

(65) Prior Publication Data

US 2004/0239899 A1 Dec. 2, 2004

(30) Foreign Application Priority Data

Dec. 11, 2002 (JP) ........................................ 2002-359604

(51) Int. Cl.$^7$ ........................ G03B 21/00; G30B 21/20; G02B 6/32; G02B 6/00; H04N 5/74
(52) U.S. Cl. ........................ 353/122; 353/31; 353/102; 385/34; 385/133; 385/146; 362/551; 348/759; 349/5
(58) Field of Search .......................... 353/122, 20, 30, 353/31, 33, 37, 53, 98–100, 119, 102; 349/5, 7–9, 58; 359/237, 483, 634, 649, 831; 385/15, 34, 133, 146, 901; 348/739, 744, 759, 766, 771, 825, 836, 844; 362/551

(56) References Cited

U.S. PATENT DOCUMENTS 6,364,493 B1 * 4/2002 Kakuta et al. .............. 353/122

FOREIGN PATENT DOCUMENTS

| JP | A 8-227034 | 9/1996 |
| JP | A 2001-228541 | 8/2001 |
| JP | A 2002-350779 | 12/2002 |

* cited by examiner

Primary Examiner—Judy Nguyen
Assistant Examiner—Rochelle Blackman
(74) Attorney, Agent, or Firm—Oliff & Berridge PLC

(57) ABSTRACT

The supporting structure for a rod integrator 300 includes, for example, holding members 350a, 350b for holding the rod integrator 300, and supporting units 360a, 360b for supporting the holding members. Each holding member 350a contacts by its planar portions (walls) respectively with two side surfaces of the rod integrator 300 adjacent to one another. The holding member 350a has a clearance such that the holding member does not contact with the edge shared by the two side surfaces of the rod integrator 300. The supporting unit 360a includes, for example, a supporting member 361a and screw 362a. The supporting unit 360a supports the rod integrator 300 by pressing of the screw 362a along the direction of the diagonal of the rod integrator 300 via the supporting member 361a. By doing so, chipping and scratching proximate to the edge can be reduced, and soiling of the reflecting plane can be prevented.

3 Claims, 5 Drawing Sheets

SUPPORTING MECHANISM FOR SOLID TYPE ROD INTEGRATOR

FIELD OF THE INVENTION

The present invention relates to a projector for projecting an image, and in particular to a supporting mechanism for a rod integrator used in an optical system of the projector.

DESCRIPTION OF RELATED ART

In the conventional projector, an optical modulation device, e.g., a liquid crystal panel or a DMD (Digital Micromirror Device: a trade mark of TexaxInstruments), is illuminated by light projected from a light source device. The optical modulation device modulates the projected light according to the image signals. The projector optical system displays an image on the screen by projecting the image light which emerged from the optical modulation device to the screen.

In such a projector, the uniformity of the illuminance is improved by a rod integrator provided on the light path of the light optical system between the light source device and the optical modulation device. Different types of rod integrators, for example, a tunnel type and a solid type are well-known.

The solid type rod integrator has columnar parts made of glass. The solid type has a merit in that the reflection ratio is high and, consequently, the utilization efficiency of the light is high. In a conventional supporting mechanism for the solid type rod integrator, the rod integrator is covered with a cover unit and supported with point contact using a screw provided on the cover unit. Such a supporting mechanism is disclosed in JP2001-228541A.

The solid type rod integrator has a surface which is exposed, and the exposed surface is sometimes soiled by oil or dust. When the surface is soiled, it can not provide total reflection, which is provided when the surface is not soiled. Furthermore, the fixing member for the rod integrator sometimes scratches or chips the rod integrator when the rod integrator is fixed by it. This results in the dispersion of the light or the generation of the light, which does not meet the condition of total reflection. The scratching or chipping is easily generated especially in the vicinity of the edge of the rod integrator.

This invention was made to address the above mentioned problem and provides techniques that enable protection of the reflection surface of the solid type rod integrator as well as support it.

SUMMARY OF THE INVENTION

In order to address one or more of the aforementioned problems, a supporting mechanism for a solid type rod integrator is provided as one aspect of the present invention. The supporting mechanism may include: a holding unit for holding a rod integrator; and a supporter for pressing the holding unit against the rod integrator to support the rod integrator. The holding unit contacts its planar portions with almost all of side surfaces of the rod integrator except in a vicinity of edges of the side surfaces and a vicinity of a light entrance plane and a light projection plane of the rod integrator.

The holding unit is preferably made of metal or resin which resists heat, because the rod integrator becomes hot by the inner reflection of light. For example, aluminum or stainless steel may be selected as the metal.

With these aspects, the surface of the rod integrator is protected and the stable support of the rod integrator is achieved through the contact between the planar portions of the holding unit and the rod integrator. Despite the surface-to-surface contact between the holding unit and the rod integrator, the condition for providing the total reflection in the rod integrator is satisfied, because there is an air layer in a micro level between the holding unit and the rod integrator. Furthermore, scratching and chipping, which may be easily generated in the vicinity of the edge, can be avoided, because the holding unit does not contact with the edge between the side surfaces of the rod integrator. Accordingly, the rod integrator can provide total reflection of light in high accuracy.

In one embodiment, the holding unit may include a single holding member which contacts with two side surfaces of the rod integrator that are adjacent to one another. In general, in order to fix the position of some object in a two dimensional plane, it is necessary to fix it along two directions. In other words, balancing of forces along two directions is required for fixing the position in a two dimensional plane. In this aspect, the supporter can support the rod integrator by pressing the holder, which contacts with two side surfaces of the rod integrator, along one direction. The supporting mechanism may be realized with a simple structure according to this aspect of the invention.

It is preferable that, in at least one of the side surfaces of the rod integrator, the holding unit contacts or covers almost all of the side surface of the rod integrator except areas having predetermined widths from the edges of the side surface. In this aspect, the side surface can be protected from soiling by dust or oil, and the rod integrator can be supported stably.

In another embodiment, the holding unit may have a shape such that the holding unit does not contact with an area on the side surface of the rod integrator that has a predetermined width from at least a selected one of the light entrance plane and the light projection plane of the rod integrator.

Scratching, chipping and soiling greatly degrade the ratio of the total reflection especially if they occur adjacent to the light entrance plane or the light projection plane. In the above aspect, the diffuse reflection can be reduced and the total reflection can be provided with high accuracy.

According to one embodiment of the present invention, the form of the rod integrator is a quadrilateral; the holding unit has a pair of holding members each of which supports two side surfaces of the rod integrator adjacent to one another; and the supporter contacts with the holding unit and presses the holding unit in the direction of a diagonal of the light entrance plane of the rod integrator.

In this aspect, the stable support of the rod integrator can be achieved with a simple structure through pressing the holding unit along the direction of a diagonal of the light entrance plane to support the holder.

The present invention can be realized in a projector that projects an image. The projector includes: a light source; a rod integrator through which a light from the light source passes; the supporting mechanism described above; an optical modulation unit for modulating the light received from the rod integrator according to image signals and projecting the light as image light which shows an image; and a projecting optical system for projecting the image light received from the optical modulation unit.

The projector equipped with the above described supporting mechanism can reduce the soiling on the surface of the rod integrator by dust or oil, and lower the generation of scratching or chipping near the edge of the rod integrator. Accordingly, the projector can reduce the diffuse reflection and provide total reflection of the light in high accuracy. The rod integrator can be supported stably, because the rod integrator is supported by the holding unit in surface-to-surface contact. Consequently, the bright and stable projection image can be provided.

The supporting mechanism may comprise: a first holding member for holding a rod integrator; and a first supporting member for pressing the first holding member against the rod integrator to support the rod integrator. The first holding member comprises: a first contact portion which contacts with a first side surface of the rod integrator; and a first facing portion which faces apart to a first side edge of the first side surface. Scratching and chipping of a rod integrator surface is easily generated in the vicinity of the edge by the holder. In an above arrangement, the first edge is not contacted by the holder. Accordingly, scratching and chippings can be reduced or eliminated.

In one embodiment, the first holding member may further comprise: a second contact portion which contacts with a second side surface of the rod integrator. The second side surface is adjacent to the first side surface and shares the first side edge with the first side surface. With this embodiment, the holding unit can fix the position of the rod integrator by contacting with two side surfaces that have different orientations.

When a form of the rod integrator is a quadrilateral (i.e., the rod integrator is four-sided), the following embodiment is preferred. In this embodiment, the supporting mechanism further comprises: and a second holding member for holding the rod integrator; a second supporting member for pressing the second holding member against the rod integrator to support the rod integrator. The second holding member comprises: a third contact portion which contacts with a third side surface of the rod integrator; a second facing portion which faces apart to a second side edge of the third side surface; and a fourth contact portion which contacts with a fourth side surface of the rod integrator. The fourth side surface is adjacent to the third side surface and shares the second side edge with the third side surface. In this embodiment, the first and second supporting members press the rod integrator directly or indirectly along a direction of a diagonal of a cross-section of the quadrilateral rod integrator in opposite directions of one another. With this embodiment, the rod integrator has its position fixed between the first and second supporting members.

In another embodiment, the fist holding unit preferably covers the first side surface except areas having predetermined widths from edges of the first side surface. With this embodiment, soiling of the first side surface can be reduced because it is covered by the holder.

When the first side surface is divided in a direction of a light axis of the rod integrator into: an entrance part which is adjacent to a light entrance plane of the rod integrator; a projection part which is adjacent to a light projection plane of the rod integrator, and a middle part disposed between the entrance part and the projection part, the following embodiment is preferred. In this embodiment, the first contact portion contacts only the middle part. Scratching and chipping of the rod integrator is easily generated in the vicinity of the edge between the side surface and the light entrance plane or the light projection plane by a holder. In an above arrangement, the edges are not contacted by the holder. Accordingly, such scratching and chipping can be reduced or eliminated.

The present invention may be realized in an embodiment of a projector for projecting an image. The projector may comprise: a light source; a rod integrator through which light from the light source passes; the supporting mechanism according to any of the embodiments described above; an optical modulation unit for modulating the light received from the rod integrator into image light which shows an image according to image signals and projecting the image light; and a projecting optical system for projecting the image light received from the optical modulation unit.

The invention is not limited to the above mentioned aspects and can be realized in many configurations. The invention can be realized, for example, in the following embodiments described herein:

1) a light source device comprising a light source, a rod integrator and a supporting mechanism for the rod integrator; and 2) a method for supporting the rod integrator.

These and other objects, features, aspects, and advantages of the present invention will become more apparent from the following detailed description of preferred exemplary embodiments and the accompanying drawings.

DETAILED DESCRIPTION OF THE INVENTION

Preferred exemplary embodiments of the invention are described below.

Figure 1:
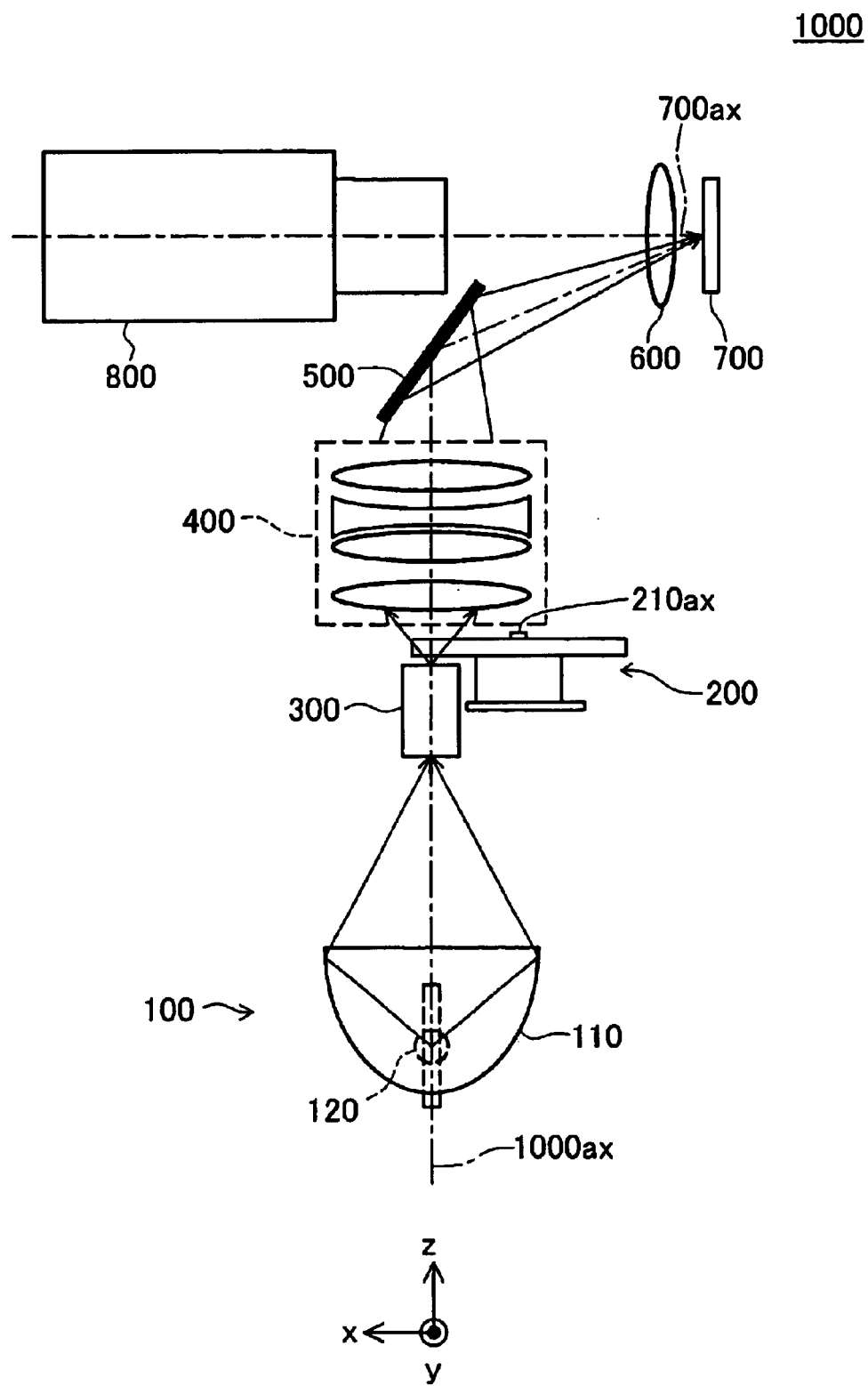
FIG. 1 shows the general structure of a projector to which is applied the supporting mechanism for a rod integrator according to one embodiment of this invention.

FIG. 1 shows the general structure of a projector to which is applied a supporting mechanism for a rod integrator according to one embodiment of this invention. Projector 1000 has a light source device 100, a color wheel 200, a solid type rod integrator 300 equipped with the supporting mechanism described below, a relay optical system 400, a reflection mirror 500, a field lens 600, a reflective optical modulation device 700, a projecting lens 800 disposed along the system optical axis 1000ax in the listed order. Hereinafter, the direction from the light source device 100 to the reflection mirror 500 along the system optical axis 1000ax is described as direction z, the direction perpendicular to the direction z in the paper plane of FIG. 1 is described as direction x, and the direction perpendicular to the direction z and the paper plane of FIG. 1 is described as direction y.

The rod integrator 300 is supported by a supporting mechanism described below so that the central axis of the rod integrator 300 comes into line with the system optical axis 1000ax. The light source 100 includes a light source lamp 120 and a parabolic mirror (or reflector) 110. The light projected from the light source device 100 is converged to one point on the system optical axis 1000ax so that it is incident to the light entrance plane of the rod integrator 300 efficiently.

The relay optical system 400 images the light projected from the rod integrator 300 onto the reflective optical modulation device 700.

The reflection mirror 500 reflects the light projected from the relay optical system 400 in the direction of the reflective optical modulation device 700.

In this embodiment, the reflective optical modulation device 700 is a DMD and modulates the illumination light so that it forms an image. The image light modulated by the reflective optical modulation device 700 is projected through the field lens 600 and the projecting lens 800.

The color wheel 200 is a disc-shaped color filter unit provided so that it can rotate around a revolution axis member 210ax. The color wheel 200 is equipped with transmissive single color filters corresponding to three primary colors of light in the order of Red, Blue and Green along the direction of rotation. The color wheel 200 is disposed in the vicinity of the projecting plane of the rod integrator 300. In this embodiment, the system called SCR is adopted. In the SCR system, all three primary colors of the color wheel constantly exist in the field corresponding to the projecting plane. The field of each color changes constantly according to the rotation of the color wheel 200.

Figure 2A:
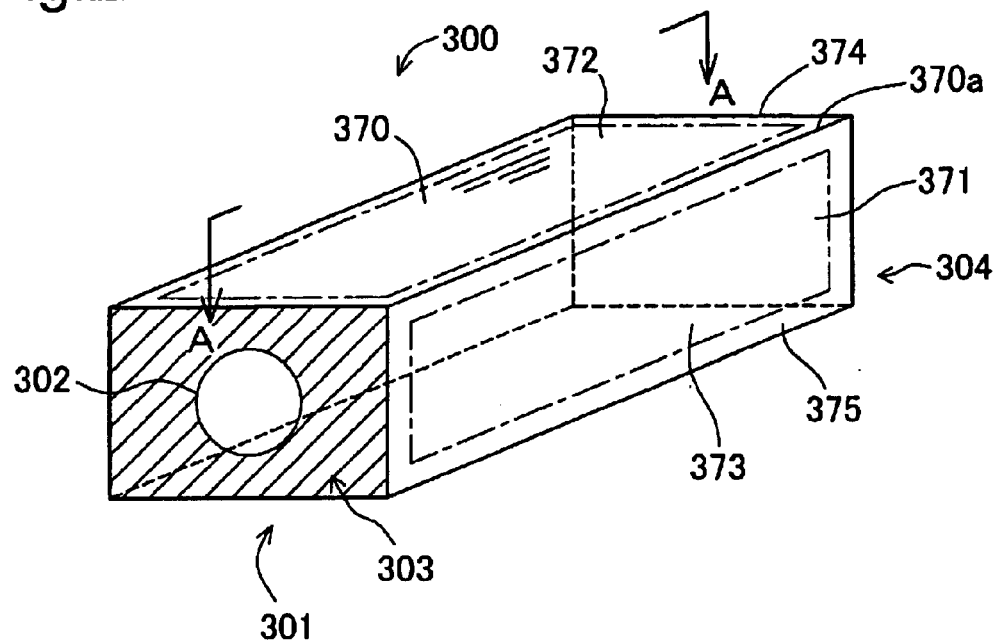
FIG. 2A shows a perspective view of the rod integrator.

FIG. 2A is a perspective illustration of the rod integrator 300. The rod integrator 300 is a rod having a rectangular cross-section, and is made of one solid glass bar. In this embodiment, the SCR system was adopted. Accordingly, the rod integrator 300 is equipped with a reflection coat 303 (shown by hatching in FIG. 2A) on the outer side of the light entrance plane 301 except for a circular light entrance aperture 302. The reflection coat 303 may be made of a dielectric multilayer, an aluminum coat or a silver coat, for example.

Figure 2B:
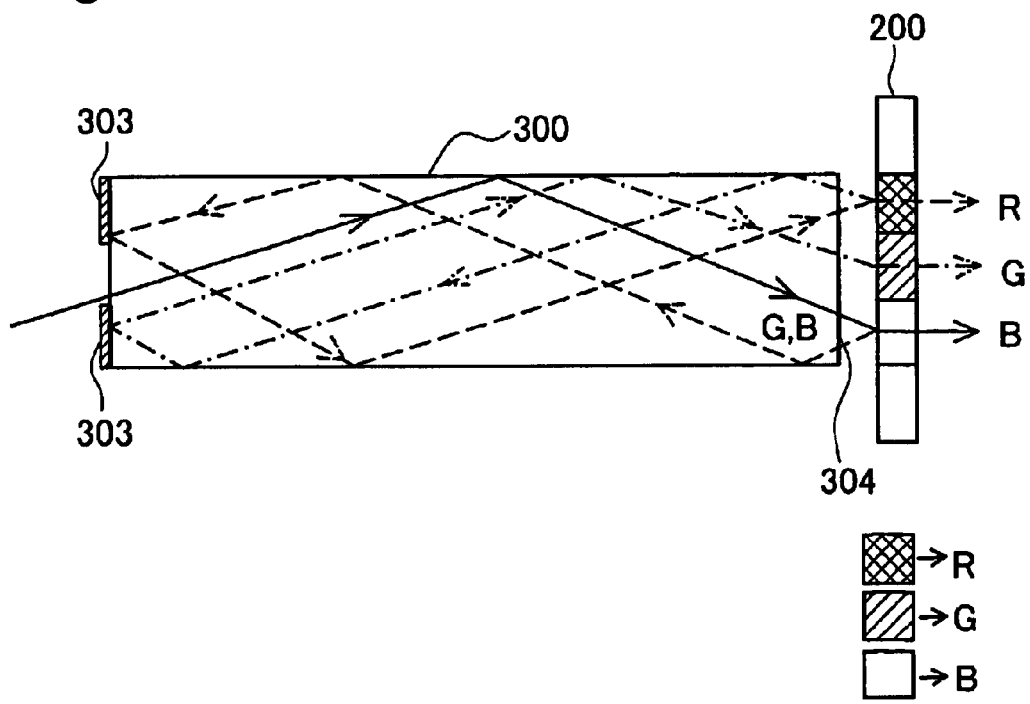
FIG. 2B shows a cross-sectional view in a plane along the arrows A in FIG. 2A.

FIG. 2B shows a cross-sectional view in the plane along the arrows A in FIG. 2A. The solid line in the rod integrator 300 indicates the part of the light projected from the light source device 100. The light (RGB light) is reflected by a reflection plane (i.e., a side surface) of the rod integrator 300 and then hits on the single color filter of B of the color wheel 200. On the single color filter B, only B component of the light goes through the filter and other components of the light (R and G) are reflected to the inside of the rod integrator 300. As shown by the broken line in the Figure, the other components of the light (R and G) are reflected on the bottom and top plane of the rod integrator 300 and on the reflection coat 303 of the light entrance plane 301, and then hit the single color filter of R of the color wheel 200. On the single color filter of R, only R component of the light goes through the filter. The other component of the light (G) is reflected again to the inside of the rod integrator 300. As shown in the dot-dash line in the Figure, the G component of the light reaches the single color filter of G of the color wheel 200 and goes through the filter after many reflections in the rod integrator 300.

In the projector 1000 with the SCR system, the light is recycled by the reflections in the rod integrator 300 and consequently, the light from the light source lamp 120 can be utilized efficiently.

Figure 3:
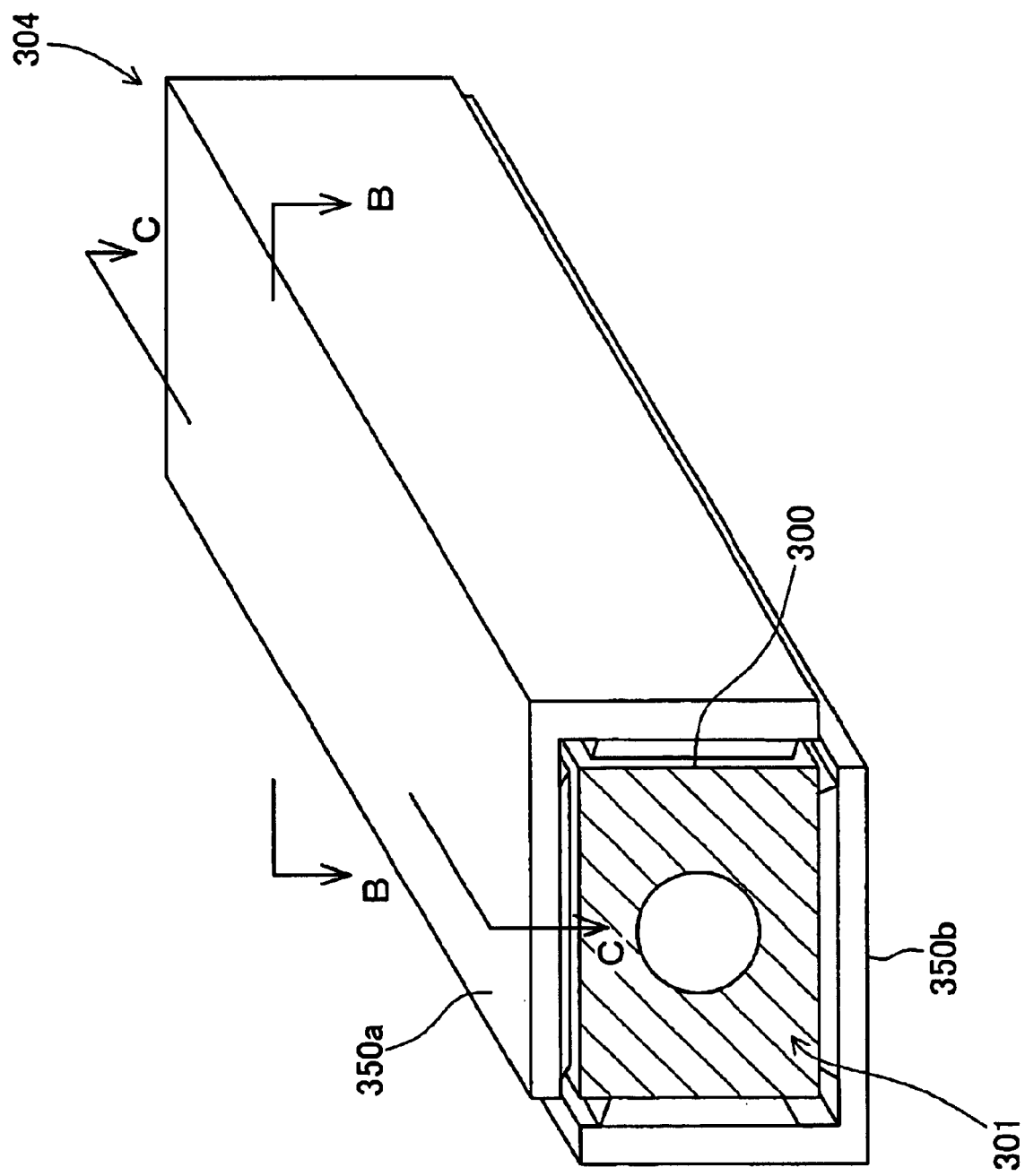
FIG. 3 is a perspective view of the supporting mechanism for a solid type rod integrator.

FIG. 3 is a perspective illustration of the solid type rod integrator 300 equipped with holding members 350a, 350b. In FIG. 3, supporting units are omitted for simplicity of the explanation. As shown in FIG. 3, the holding member 350a has a shape such that planar portions (walls) of the holding member 350a contact respectively with two side surfaces of the rod integrator 300 adjacent to one another, but the holding member 350a does not contact with the edge shared by the two side surfaces. The side of the holding member 350a proximate to the light entrance plane 301 has an oblique profile. Consequently, the holding member 350a does not contact with: (1) the edge shared by the light entrance plane 301 and the side surfaces 370, 371 of the rod integrator 300, and (2) the areas 374, 375 having predetermined widths from edges of the side surface. The holding member 350a only contacts with the areas 372, 373 of the side surfaces 370, 371 of the rod integrator 300 extending from a location of a predetermined distance from the edge (shown by the dashed line in FIG. 2A). The same is true on the side of the light projection plane 304. The holding member 350b has a similar structure to the holding member 350a, and contacts with and holds the rod integrator 300 in a similar manner. The shapes of the holding members and the way of supporting with supporting unit are described in the following description using FIGS. 4 and 5.

Figure 4:
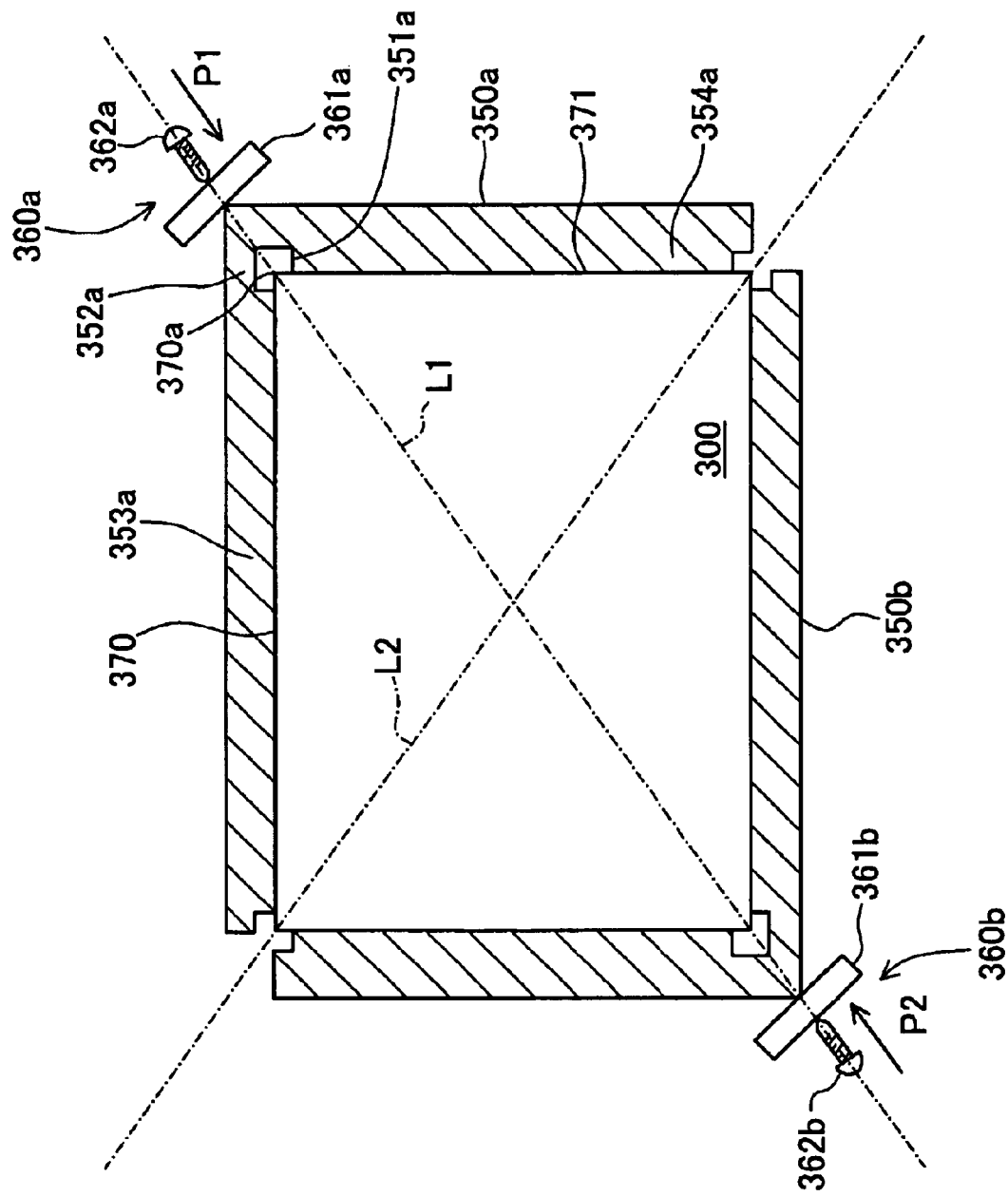
FIG. 4 shows a cross-sectional view of the structure around the rod integrator in a plane along the arrows B in FIG. 3.

FIG. 4 shows a cross-sectional view of the structure around the rod integrator 300 in a plane along the arrows B in FIG. 3. The areas that are shown by hatching indicate the holding members 350a, 350b. The planar portions (walls) of the holding member 350a contact respectively with the two side surfaces 370, 371 of the rod integrator 300 adjacent to one another, to hold the rod integrator 300. The holding member 350a has a substantially rectangular clearance 351a by which the holding member 350a does not contact with the edge 370a shared by the two side surfaces 370, 371. In other words, the portion 352a that forms the clearance 351a is spaced apart from the edge 370a shared by the side surfaces 370, 371. The holding member 350a and the rod integrator 300 (i.e., the side surfaces 370, 371) are not adhered to each other, and the boundaries between them has an air layer. Accordingly, the boundaries (i.e., the side surfaces of the rod integrator) meet the condition for total reflection of the light. The rod integrator 300 is supported by the portions 353a, 354a of the holding member 350a which contact with the side surfaces 370, 371 of the rod integrator 300 without adherence respectively. The same is true with respect to the boundaries between the rod integrator 300 and the holding member 350b.

The supporting unit 360a supporting the holding member 350a has a supporting member 361a, and a screw 362a which presses the supporting member 361a to press it against the holding member 350a. The supporting unit 360b supporting the holding member 350b has a similar structure as the supporting unit 360a, and has a supporting member 361b and a screw 362b. The screw 362a presses the supporting member 361a along the direction of the diagonal L1 of the rod integrator 300 as shown by arrow P1 to support the holding member 350a. The screw 362b presses the supporting member 361b along the direction of the diagonal L1 of the rod integrator 300 as shown by arrow P2 to support the holding member 350b. In this embodiment, a plurality of the respective supporting units are provided along the edges of the rod integrator to press the rod integrator 300 in opposite directions. Consequently, the rod integrator 300 covered by the holding members 350a, 350b is pinched in the direction of the diagonal L1 by a plurality of supporting units 360a and 360b, and fix the position of the rod integrator 300 within the projector 1000.

Figure 5:
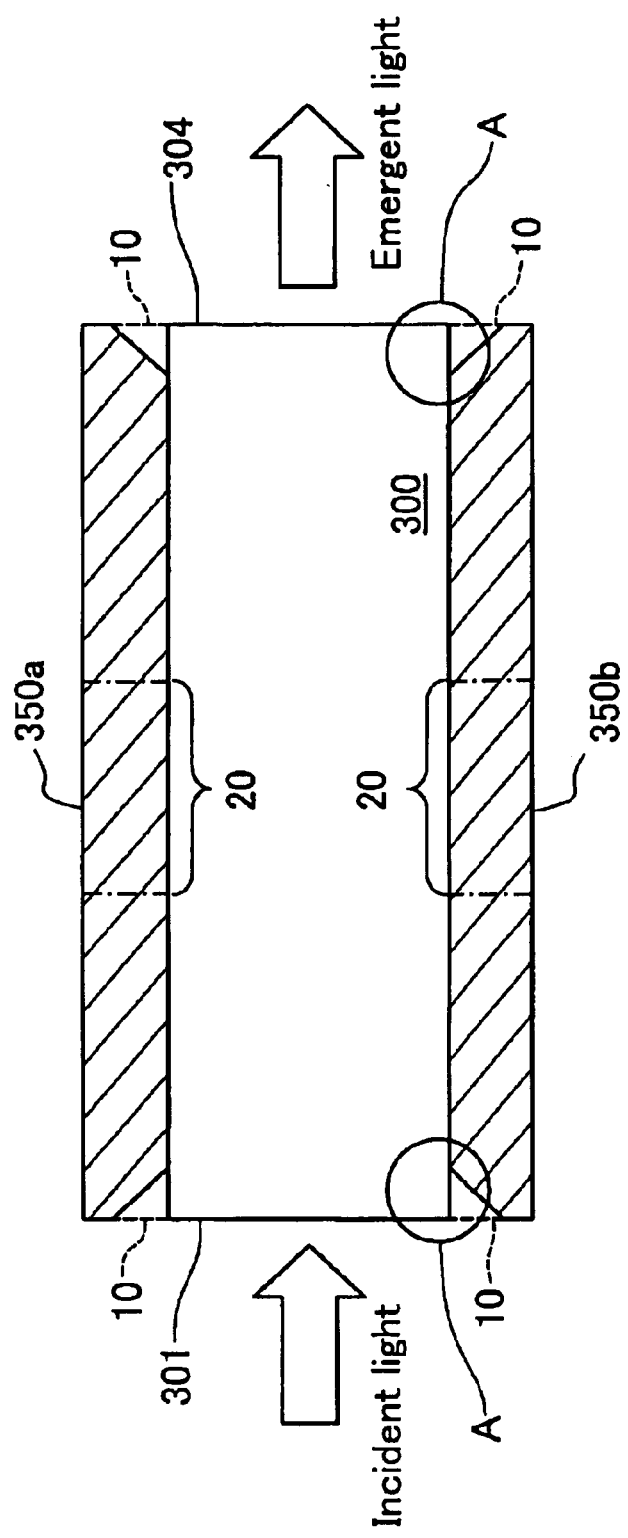
FIG. 5 shows a cross-sectional view of the supporting mechanism for the rod integrator in the plane including the light axis.

FIG. 5 shows a cross-sectional view of the structure around the rod integrator 300 in the plane along the arrows C in FIG. 3. As shown in FIG. 5, the holding members 350a and 350b are configured to cover and contact with almost the entirely of the side surfaces of the rod integrator 300 except for the predetermined areas A including the edge of the light entrance plane 301 and the edge of the light projection plane 304. Chipping and scratching proximate to the edge of the light entrance plane 301 and the light projection plane 304 on the rod integrator 300 have a great influence over the reflecting light in the rod integrator 300. The portion of the side surface of the rod integrator 300 adjacent to the edges is easily chipped and scratched. With the above described structure, this embodiment prevents such chipping and scratching. Furthermore, soiling of the rod integrator is avoided, and the stable support of the rod integrator is provided.

By applying the supporting structure as one embodiment of the invention to the projector, the generation of chipping and scratching proximate to the edges can be reduced. The supporting structure further prevents the soiling of the reflecting planes by oil or dust by covering and contacting with the reflecting planes (i.e., the side surfaces). The supporting structure also provides for the stable support of the rod integrator by supporting it by surface-to-surface contact (planar portion of the supporting structure contacts the side surface of the rod integrator).

In above embodiment, the holding members 350a, 350b contact almost the entirety of the side surfaces of the rod integrator. The holding of the rod integrator is not limited to such a configuration. For example, the holding member may hold only a portion proximate to the light entrance plane 301 and the light projection plane 304 without holding the portion of the area 20 shown by the dashed line in FIG. 5. A plurality of such non-holding areas 20 may be provided between a plurality of holding areas. In other words, the holding member may hold the rod integrator by a plurality of portions on the side surfaces of the rod integrator (i.e., the holding areas). The holding member may hold only the portion proximate to the light projection plane where there is an especially great influence of scratches or chipping on the reflection of the light.

In the above described embodiment, the holding members 350a, 350b have a clearance such that the holding member does not contact with the edge shared by the two side surfaces. The shape of the clearance is substantially rectangular. The shape of the holding member is not limited to such configuration, and the shape of the clearance may be, for example, circular or other shapes. In other words, the clearance may take any shape as long as the holding member does not contact with the edge.

In the above described embodiment, the supporting units press the holding members along the direction of the diagonal of the rod integrator to support it. In other words, the supporting unit presses two side surfaces of the rod integrator with each holding member. The supporting of the rod integrator is not limited to such a configuration. A supporting unit may be provided for each side surface of the rod integrator respectively. In this embodiment, the supporting unit for each side surface may press the side surface toward the center axis of the rod integrator to support the rod integrator.

In the above described embodiment, the holding member is provided on almost the entirety of the area of the side surfaces except for the area near the light entrance plane and near the light projection plane. The holding of the rod integrator is not limited to such a configuration. The holding member may hold the area up to the edges of the light entrance plane and the light projection plane (shown by broken lines 10 in FIG. 5).

In the above described embodiment, the explanation was made with respect to a projector which includes a DMD as the optical modulation device. The projector to which this invention can be applied is not limited to such a type of projector. This invention can be applied to a projector which uses other types of the reflective optical modulation devices, for example, GLV (Grating Light Valve) or to a reflective liquid crystal panel. This invention can be applied to a projector which uses a transmissive optical modulation device instead of a reflective optical modulation device. A transmissive liquid crystal panel can be used as the transmissive optical modulation device. This invention may be adapted to an optical device other than a projector. In other words, this invention may be applied to any kind of optical device that uses a rod integrator.

While the invention has been described with reference to preferred exemplary embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more less or only a single element, are also within the spirit and scope of the invention.

What is claimed is:

1. A supporting mechanism for a rod integrator, a cross-sectional shape of the rod integrator is a quadrilateral, the supporting mechanism comprising:
    a first holding member that holds a rod integrator;
    a first supporting member that presses the first holding member against the rod integrator to support the rod integrator,
    the first holding member comprises:
        a first contact portion which contacts with a first side surface of the rod integrator;
        a first facing portion which is spaced from a first side edge of the first side surface; and
        a second contact portion which contacts with a second side surface of the rod integrator, the second side surface being adjacent to the first side surface and sharing the first side edge with the first side surface;
    a second holding member that holds the rod integrator,
    a second supporting member that presses the second holding member against the rod integrator to support the rod integrator,
    the second holding member comprises:
        a third contact portion which contacts with a third side surface of the rod integrator;
        a second facing portion which is spaced from a second side edge of the third side surface; and
        a fourth contact portion which contacts with a fourth side surface of the rod integrator, the fourth side surface being adjacent to the third side surface and sharing the second side edge with the third side surface, wherein
    the first and second supporting members press the rod integrator along a direction of a diagonal of the quadrilateral cross section of the rod integrator in opposite directions to one another.

2. A supporting mechanism according to claim 1, wherein when the first side surface is divided in a direction of a light axis of the rod integrator into:
    an entrance part which is adjacent to a light entrance plane of the rod integrator; and
    a projection part which is adjacent to a light projection plane of the rod integrator, and a middle part between the entrance part and the projection part, the first contact portion contacts only the middle part.

3. A projector for projecting an image, comprising:

a light source;

a rod integrator through which a light from the light source passes;

the supporting mechanism according to claim 1;

an optical modulation unit that
modulates the light received from the rod integrator into image light which shows an image according to image signals, and
projects the image light; and a projecting optical system that projects the image light received from the optical modulation unit.

* * * * *